United States Patent
Bräunlich et al.

(10) Patent No.: US 7,679,881 B2
(45) Date of Patent: Mar. 16, 2010

(54) ELECTRICAL ENTITY WITH OPENING OF THE LOAD CURRENT CIRCUIT IN AN EXPLOSION-VULNERABLE ENVIRONMENT

(75) Inventors: Michael Bräunlich, Chemnitz (DE); Ralf Lohse, Jahnsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 432 days.

(21) Appl. No.: 11/652,259

(22) Filed: Jan. 11, 2007

(65) Prior Publication Data

US 2007/0161276 A1    Jul. 12, 2007

(30) Foreign Application Priority Data

Jan. 11, 2006    (EP)    .................................. 06000536

(51) Int. Cl.
*F23Q 7/24*    (2006.01)
*H01R 33/00*    (2006.01)
(52) U.S. Cl. ........................ 361/248; 361/206; 361/785
(58) Field of Classification Search ................ 361/206, 361/785, 248
See application file for complete search history.

(56) References Cited

U.S. PATENT DOCUMENTS

| 2,848,572 | A | * | 8/1958 | Wagnecz ................. 200/50.29 |
| 4,214,291 | A | | 7/1980 | Koshman et al. |
| 4,737,603 | A | | 4/1988 | Lycan |
| 5,328,388 | A | * | 7/1994 | Fust et al. ................... 439/544 |
| 5,639,261 | A | * | 6/1997 | Rutkowski et al. .......... 439/534 |
| 6,638,088 | B1 | * | 10/2003 | Richardson ................. 439/242 |

FOREIGN PATENT DOCUMENTS

| DE | 100 58 107 A1 | 6/2002 |
| EP | 1 156 272 A2 | 11/2001 |
| GB | 1 501 818 | 2/1978 |

\* cited by examiner

*Primary Examiner*—Stephen W Jackson
*Assistant Examiner*—Zeev Kitov

(57) ABSTRACT

There is described an electrical system including a device which features a load current circuit and connection terminals for connection of the load current circuit. In the supply line to the connection terminals, separation contacts are present for separating the load current circuit during operation of the device. Means for explosion protection are provided in connection with the separation contacts.

10 Claims, 1 Drawing Sheet

ELECTRICAL ENTITY WITH OPENING OF THE LOAD CURRENT CIRCUIT IN AN EXPLOSION-VULNERABLE ENVIRONMENT

CROSS REFERENCE TO RELATED APPLICATIONS

This application claims priority of European application No. 06000536.0 EP filed Jan. 11, 2006, which is incorporated by reference herein in its entirety.

FIELD OF INVENTION

The invention relates to an electrical entity including a device which has a load current circuit and connection terminals for connection to the load current circuit.

BACKGROUND OF INVENTION

Many electrical entities of the aforesaid kind are known. Such an electrical entity can be a modular control system, for example, including a plurality of assemblies as devices which are intended where possible to be exchangeable during operation. For assemblies which are not installed in an environment where explosive gas mixtures or dust/air mixtures are present, this usually involves relatively straightforward implementation requirements in terms of the construction design and logical bus system. However, issues arise if the control system is located in an Ex environment. Here, the separation of the assembly or device from the system is only permissible if e.g. exclusively intrinsically safe current circuits are connected via the plug connectors which must be separated. In the case of a relay assembly, this is only possible for the logical part, i.e. the bus connection and the activation of the relay.

Voltages of 60 V to 250 V and currents of several amperes are usually permissible for the load current circuit. If such a load current circuit is separated at the plug connector during operation, the resulting sparks can cause an ignition of the surrounding explosive mixture.

Even if the current circuit has been safely disconnected it cannot be assumed that the relay contacts are really open. Sticking relay contacts could be detected via a safety relay, but it would still not be permissible to exchange the relay assembly under load in the case of a sticking contact pair. In this case it would first be necessary to disconnect the load voltage via an Ex-approved isolating switch installed in the same zone or, as the case may be, via a normal switch which is installed in a safe environment.

An additional expense would therefore be required in each case, said expense being partially associated with personnel having special authorizations.

SUMMARY OF INVENTION

The invention therefore addresses in one aspect the problem of improving an electrical entity of the type described above such that separation of the device from the load current circuit is possible during operation in an Ex environment.

The problem is solved by the presence, in the supply line to the connection terminals, of separation contacts for separating the load current circuit during operation of the device, wherein means for explosion protection are provided in connection with the separation contacts.

Advantageous developments of the invention may be derived from the subclaims.

BRIEF DESCRIPTION OF THE DRAWINGS

The invention is explained in greater detail below with reference to an exemplary embodiment of an electrical device shown in two figures.

The invention is illustrated with reference to the figures for simplicity.

DETAILED DESCRIPTION OF INVENTION

Figure 1:
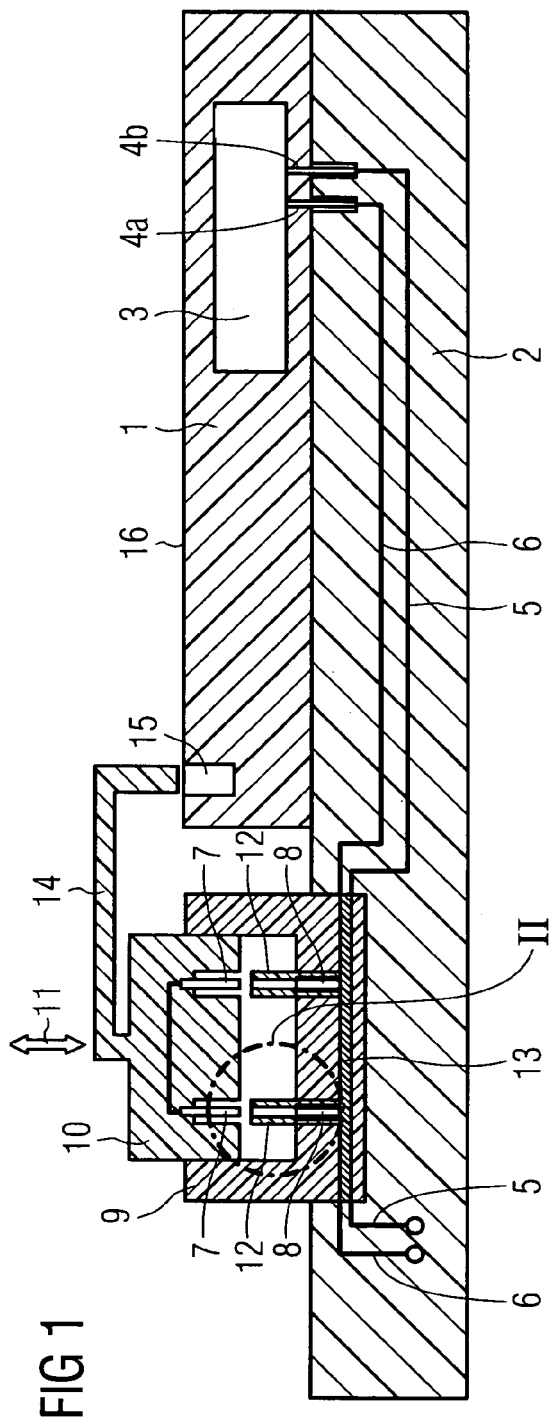
Figure 2:
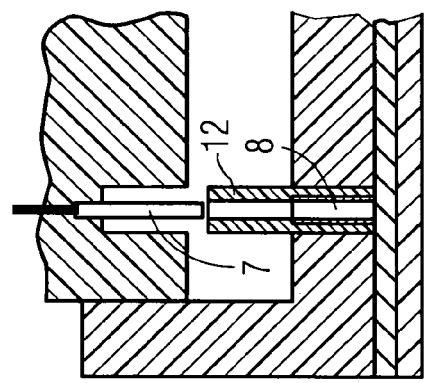

The figure shows an electrical device, in this case a relay assembly 1, which is mechanically and electrically adapted to a terminal module 2. Here, this concerns in particular a component of a modular control system which normally includes assemblies of various types, e.g. for power supply, logic assemblies, etc. The present invention is not restricted to this field alone, however, and can also be applied in other cases. The relay assembly 1 according to the figure has a relay 3, whereby a load current circuit is formed with the externally accessible connection terminals 4a, 4b on the relay assembly 1. With the aid of plug contacts which are not illustrated in greater detail here, a supply is provided via two lines 5, 6 in the terminal module 2 to the connection terminals 4a, 4b and therefore to the load current circuit. Integrated in the terminal module 2 is a contact assembly, including separation contacts 7, 8 for separation of the load current circuit, in which the lines 5, 6 can be opened. The contact assembly is composed of a socket part 9 and pin part 10 which is at least partly retractable, and meets the conditions which are specified for an Ex environment according to the regulations.

The pin part 10 features at least four contact pins 7, of which two are electrically bridged in each case. Corresponding opposing socket contacts 8 are located in the socket part 9. The figure shows the state in which the load current circuit is separated, i.e. the pin part 10 is partly withdrawn and therefore the contact pins 7 are likewise withdrawn from the socket contacts 8. The double arrow 11 shows the direction of movement of the retractable pin part 10. The invention is not limited to this, however, since the socket part 9 could be designed to be retractable instead. In the present exemplary embodiment, the socket contacts 8 are seated in a defined slot in order to ensure explosion protection, and are surrounded in each case by a plastic tube 12. This configuration complies with the requirements of an Ex-d slot as per the regulations.

At their ends, the socket contacts 8 are soldered onto a circuit board 13 and electrically connected to the lines 5 and 6. For the sake of simplicity, only two contact pins 7 and the associated socket contacts 8 for separating one of the two lines 5, 6 are illustrated in the figure.

The contact assembly is mechanically structured such that it satisfies two further mechanical requirements:

1. In the engaged state, access to the lock of the relay assembly is prevented such that it cannot be released. Only in the released state, when the load current circuits of the relay are safely free of current, can the relay assembly be removed and exchanged.
2. The release of the assembly and therefore the separation of the load current circuits which are not intrinsically safe cannot be abrupt, but is designed as a two-stage process. Alternatively, a method is also conceivable which guarantees a slow and steady release of the contacts. This could be implemented e.g. with the aid of a screw and corresponding thread pitch.

The pin part 10 is equipped with an arm 14, for example, whose angled end engages in an opening 15 of the device housing 16 in the closed state of the separation contacts 7, 8 and therefore prevents the release of the relay assembly 1.

The invention claimed is:

1. An electrical system, comprising:
a device having a load current circuit and connection terminals for the load current;
an electrical supply line for the load current to the connection terminals; and
a plurality of explosion protected separation contacts in the supply line to separate the load current circuit during operation of the electrical system,
wherein the device is an assembly of a modular control system that includes a terminal module to which the assembly is mechanically and electrically adapted, and wherein a lock for the assembly is provided, which prevents the release of the assembly from the terminal module in a closed state of the explosion protected separation contacts the lock includes a pin part equipped with an arm having an angled end engaged in an opening of a device housing in the closed state of the separation contacts and therefore preventing the release of the relay assembly.

2. The electrical system as claimed in claim 1, wherein the device comprises a relay having the load current circuit.

3. The electrical system as claimed in claim 1, wherein the explosion protected separation contacts are socket contacts and matching pin contacts.

4. The electrical system as claimed in claim 3, wherein a socket part comprises the socket contacts and a pin part comprises the pin contacts, wherein the socket part and the pin part form a contact assembly which is separate from the device.

5. The electrical system as claimed in claim 4, wherein the pin part or the socket part is at least partly retractable in order to separate the contacts.

6. The electrical system as claimed in claim 3, wherein the socket contacts are surrounded by plastic tubes.

7. The electrical system as claimed in claim 6, wherein the socket contacts and the plastic tubes are placed in slots.

8. The electrical system as claimed in claim 1, wherein the assembly is a relay assembly comprising at least one relay.

9. A method for separating a relay from a load current circuit during a current flow in an explosive vulnerable environment, comprising:
providing the relay, having a load current circuit and connection terminals connected to a supply line, the supply line having explosion protected separation contacts to separate the load current circuit during operation of the relay;
opening the explosion protected separation contacts; and
disconnecting the connection terminals from the supply line, wherein a lock is provided to prevent the disconnection of the connection terminals from the supply line when the explosion protected separation contacts are closed the lock includes a pin part equipped with an arm having an angled end engaged in an opening of a device housing in the closed state of the separation contacts and therefore preventing the release of the relay assembly.

10. The method for separating a relay form a load current circuit as claimed in claim 9, wherein a unit is provided comprising a part of the explosion protected separation contact and a part of the connection terminals.

* * * * *